US006931546B1

(12) United States Patent
Kouznetsov et al.

(10) Patent No.: US 6,931,546 B1
(45) Date of Patent: Aug. 16, 2005

(54) SYSTEM AND METHOD FOR PROVIDING APPLICATION SERVICES WITH CONTROLLED ACCESS INTO PRIVILEGED PROCESSES

(75) Inventors: Victor Kouznetsov, Aloha, OR (US); Dan Melchione, Beaverton, OR (US); Martin Fallenstedt, Beaverton, OR (US)

(73) Assignee: Network Associates, Inc., Santa Clara, CA (US)

( * ) Notice: Subject to any disclaimer, the term of this patent is extended or adjusted under 35 U.S.C. 154(b) by 1040 days.

(21) Appl. No.: 09/651,465

(22) Filed: Aug. 30, 2000

Related U.S. Application Data (60) Provisional application No. 60/178,826, filed on Jan. 28, 2000.

(51) Int. Cl.$^7$ .............................................. G06F 12/14
(52) U.S. Cl. ...................................... 713/200; 717/174
(58) Field of Search ................................ 713/200, 168, 713/202; 705/67; 717/168–178; 709/220–222

(56) References Cited

U.S. PATENT DOCUMENTS

| | | | | |
|---|---|---|---|---|
| 5,361,359 A | * | 11/1994 | Tajalli et al. ................ | 713/200 |
| 5,838,918 A | * | 11/1998 | Prager et al. ................ | 709/221 |
| 5,860,012 A | | 1/1999 | Luu ........................... | 395/712 |
| 5,870,611 A | | 2/1999 | London Shrader et al. . | 395/712 |
| 5,959,989 A | | 9/1999 | Gleeson et al. ............. | 370/390 |
| 5,966,540 A | | 10/1999 | Lister et al. ................ | 395/712 |
| 5,991,856 A | | 11/1999 | Spilo et al. ................. | 711/147 |
| 6,006,035 A | | 12/1999 | Nabahi ....................... | 395/712 |
| 6,233,576 B1 | * | 5/2001 | Lewis .......................... | 707/9 |
| 6,262,726 B1 | * | 7/2001 | Stedman et al. ............. | 715/745 |
| 6,308,182 B1 | * | 10/2001 | Nishigaya et al. ....... | 707/103 R |
| 6,393,569 B1 | * | 5/2002 | Orenshteyn ................. | 713/201 |
| 6,418,554 B1 | * | 7/2002 | Delo et al. .................. | 717/174 |
| 6,591,373 B1 | * | 7/2003 | Ardis et al. .................. | 714/7 |
| 6,745,241 B1 | * | 6/2004 | French et al. ............... | 709/221 |
| 2005/0015775 A1 | * | 1/2005 | Russell et al. .............. | 719/315 |

OTHER PUBLICATIONS

Trent Jaeger and Aviel Rubin, "Protocols for Authenticated Download to Mobile Information Appliances", University of Michigan, Department of Electrical Engineering and Computer Science, Dec. 1995, pp. 1-12.*

Microsoft Outlook 98 Deployment Kit, Chapter 2 Installation and Configuration.*

* cited by examiner

*Primary Examiner*—Andrew Caldwell
*Assistant Examiner*—Minh Dieu Nguyen
(74) *Attorney, Agent, or Firm*—Christopher J. Hamaty, Esq.; Swidler Berlin LLP (57) ABSTRACT

A system for providing application services in a computing environment having both user-mode processes and privileged-mode processes. An agent executes in privileged mode and exposes an interface to user-mode processes. A user-mode component is provided with an interface configured to access the agent's exposed interface. A configuration component specifies a list of installable code components that are authorized for installation, wherein the agent will only execute privilege mode functions in response to accesses by the user-mode code component when the installable code component is represented on the list.

18 Claims, 5 Drawing Sheets

```
myCIO.ini

[AutoRegister]
filename1=<commands to register>
filename2=<commands to register>
   .
   .
   .
filenameN=<commands to register>

[AutoUnregister]
filename1=<commands to unregister>
filename2=<commands to unregister>
   .
   .
   .
filenameN=<commands to unregister>

[allowAdmin]
<GUID 1>
<GUID 2>
   .
   .
   .
<GUID M>
```

FIG. 5

SYSTEM AND METHOD FOR PROVIDING APPLICATION SERVICES WITH CONTROLLED ACCESS INTO PRIVILEGED PROCESSES

RELATED APPLICATIONS

The present invention claims priority to copending U.S. Provisional Patent application Ser. No. 60/178,826 entitled "METHOD AND SYSTEM FOR REMOTELY PROVIDING NETWORK SECURITY AND AVAILABILITY SERVICES" filed Jan. 28, 2000, the specification of which is incorporated herein by reference.

The present application is also related to U.S. patent applications, all of which are filed concurrently herewith and are incorporated by reference herein:

Serial No. 09/651,466 entitled SYSTEM AND METHOD FOR PROVIDING DYNAMIC APPLICATION SERVICES Serial No. 09/650,983 entitled SYSTEM AND METHOD FOR EFFICIENT DISTRIBUTION OF APPLICATION SERVICES Serial No. 09/651,467 entitled SYSTEM AND METHOD FOR SECURELY PROVIDING APPLICATION SERVICES Serial No. 09/650,559 entitled SYSTEM AND METHOD FOR PERSISTENT, EFFICIENT DISTRIBUTION OF APPLICATION SERVICES Serial No. 09/650,558 entitled METHOD FOR CLOSING SALES OVER AN OPEN NETWORK USING AN AUTOMATED HAGGLING

BACKGROUND OF THE INVENTION

1. Field of the Invention

The present invention relates, in general, to application software, and, more particularly, to software, systems and methods for providing application services with controlled access into privileged processes.

2. Relevant Background

Application software generally refers to a collection of software mechanisms that implement a desired program behavior to manipulate data provided by a user and/or obtained from both internal and external data stores. A software application typically is implemented on top of an operating system (OS) that provides essential functionality for interfacing with computer system hardware and program interaction. A software application typically implements a user interface using devices such as keyboards, mice, microphones, monitors, and the like to communicate data with a user. Examples include word processors, anti-virus programs, spreadsheets, world-wide-web browsers, and the like.

Application software continues to become more complex and interrelated. As computer hardware becomes more powerful, less expensive, and more ubiquitous in electronic devices, application software that operates on this hardware becomes both more complex and more varied. Unlike hardware, however, software mechanisms tend to evolve rapidly to adapt to new environments and provide additional functionality. This leads to a situation in which installed software applications require, or at least benefit from, continued monitoring and maintenance by skilled software professionals familiar with the construction and mechanisms that make up the software. Although the problem is more pronounced in complex software applications such as security software, anti-virus software, and the like, it remains a significant problem even for comparatively simple applications that must augment or modify behavior to remain competitive.

Coincidentally, software reliability is becoming more important. As people rely on software performance for more business and personal activities, the cost of software downtime and poor performance have become more significant. These costs are realized both in terms of money and lost time.

The field of "software application management" encompasses a large number of activities undertaken by a business or other software user throughout the life cycle of a software application. Currently, a business need is identified and a software application that can satisfy that need is sought out. The business user typically purchases not only the application, but also associated services necessary to maintain the application. The business typically traverses the "learning curve" during an initial inefficient stage of application deployment while users become familiar with the features and limitations of the application. Often, once the business enters a phase where the application can be used efficiently, the product is already nearing the end of its life cycle and partial or wholesale upgrades must be considered. For complex applications, the users may never completely traverse the learning curve. Hence, a need exists for more efficient deployment of application software.

A common problem in application management is that the people employed to manage the application's deployment are less familiar with the application's functions, features and behavior than are the people who produced the application. This tends to make the application management task complex for those charged with performing it. Businesses are often forced to employ or contract with information technology (IT) specialists to manage the application deployment process.

Application providers have made many efforts to simplify the process of application management. For example, many applications provide downloadable access to updates and patches. This eases distribution of updates and patches, but essentially places the burden of maintaining an application on the user. The user must determine when an update is required and then find, download, install, configure, and maintain the updated code. Curiously, it is the application provider that is often best positioned to perform some or all of these tasks.

Some recently implemented software systems attempt to implement an application using an application service provider model. In this model application code is executed on a network-connected server in response to requests presented by a client application. The client application serves principally as a user interface to the network and may comprise software such as a web browser or the like. In such systems only a limited amount of code is actually executed on the client machine and this is often code that is not specific to the application at hand. These systems enable centralized deployment of the application code making it easier to monitor, modify and update the code.

While the application service provider model recognizes that applications can be provided as services, it is limited in performance due to the centralized nature of its implementation. By running applications on a central server, the overall system performance is subject to performance bottlenecks in the channel linking the client to the centralized application server as well as the capacity and functionality of the server itself. Moreover, the server is logically distant from the client platform (i.e., the client hardware and operating system) and so may be unable to perform behaviors that would be readily implemented by software executing on the client system. In general, the application service provider model is a limited solution to the challenges of application management and continues to place a significant portion of the application management burden on the end user or IT staff supporting the end user.

It is desirable to install and update software application code so as to provide application services from external application services providers. This enables the application services to be maintained and managed by the external provider with minimal impact on the user of the application services. However, providing such application services typically requires access to privileged processes on the user's computer in order to replace the functions previously performed by IT specialists or the users themselves.

In many computer systems a software application executes within the context of a "process". A process is the active entity associated with a running program and possesses one or more threads of execution along with some amount of resources such as virtual memory address space. It is common to distinguish between the process, which is an embodiment of a running program, and the program itself. The program itself refers to the files system object (i.e., a file) containing a stored representation of the instructions that determine the computer's execution.

Processes have certain attributes, known as credentials or privileges, that reflect their ability to perform various specialized operations. The credentials reflect the privileges assigned to the entity on whose behalf the process was initiated. The entity may be a person, or may be another software program that has authorization to execute the processes. Privileges are assigned by a system administrator who initially is given administrator rights, which enables the administrator to assign rights to other entities.

Entities are assigned different capabilities or privileges based upon their work requirements, level of trust by the computer system administrator, and the like. Trusted entities are given privileges that allow "privileged processes" running on their behalf to execution various operations that might otherwise be forbidden by the operating system. Privilege levels are given a variety of names such as "user-level" to designate a most restrictive privilege set and "admin-level" to designate a least restrictive privilege set.

Access to privileged processes is carefully guarded by most operating system (OS) software. Computer systems can be disabled and/or destroyed by inappropriate use of privileged processes. For example, in a Windows environment the installation process requires manipulation of registry objects. Addition, deletion, and modification of registry objects can render the computer unable to boot the operating system. For these reasons most privilege mode processes provide carefully limited behavior that is readily checked by system safeguards.

Various software installation systems are available such as InstallShield, Wise Installation System, and Microsoft Setup Toolkit. These systems are generally implemented by a rule-based installation engine executing on the client machine. The rule-based engine implements a set of rules that are expressed in a rule-based instruction file that accompanies the software to be installed. The installation engine has sufficient privileges to manipulate registry entries. The installation engine is invoked by a user who must also have sufficient privileges. The user continuously monitors the progress of the installation process and so can, in theory, prevent undesired modifications to registry objects.

To enable remote provision of application services (e.g., automated or semi-automated installation programs), the user invocation and monitoring of access to privileged processes must be eliminated or minimized. For example, it would be desirable to enable a script running in a web browser, which has only user-level privileges, to update application code involving access to a registry entry. The operating systems prevent user-level entities from performing such an operation. A possible solution is to provide a "generic" interface with less restrictive access to privileged processes. This would be akin to giving the general-purpose web browser admin-level privileges. Such a system would be highly flexible, but very insecure as the operating system could be readily penetrated by unauthorized entities, viruses, and/or programs with bugs.

Remote provision of application services also benefits from having a wide, readily extensible set of privileged processes that can be performed. Unlike conventional rule-based installation programs, a generic agent existing on a client system may need to access any part of a registry file to create, modify and delete entries. A need exists for systems and methods to provide generic, readily extensible mechanisms that are able to access privileged processes without exposing the client system to intentional or inadvertent security risks.

SUMMARY OF THE INVENTION

The above limitations of the prior art are addressed by a system, method and software in which a process is run on a client machine having sufficient privileges to execute privileged processes. This process has a role of a "local system" and is effectively an administrator for the machine. An agent program running in user-mode provides a generic interface. The agent includes an application programming interface ("API") for receiving requests for privileged processes. The agent includes an interface to the privileged process as well. The agent includes methods for authenticating any received requests and will only forward a request to the privileged process upon determining that the requesting application has sufficient trust. Hence, the agent provides a level of indirection in accessing the privileged process so that the local system interface is not exposed directly to untrusted entities.

Briefly stated, the present invention involves a system for providing application services in a computing environment having both user-mode processes and privileged-mode processes. An agent executes in privileged mode and exposes an interface to user-mode processes. A user-mode component is provided with an interface configured to access the agent's exposed interface. A configuration component specifies a list of installable code components that are authorized for installation, wherein the agent will only execute privileged-mode functions in response to accesses by the user-mode code component when the installable code component is represented on the list.

DETAILED DESCRIPTION OF THE PREFERRED EMBODIMENTS

The present invention is illustrated and described in terms of a system for providing application services. However, more generally the invention provides mechanisms and methods for enabling secure remote access to privileged processes on a client computer. While the functionality provided by the instant invention is useful for installation and updating of software application code used to provide application services, it is more generally useful in any environment that requires controlled access to privileged processes and features provided by a client computing platform.

The preferred implementation comprises a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
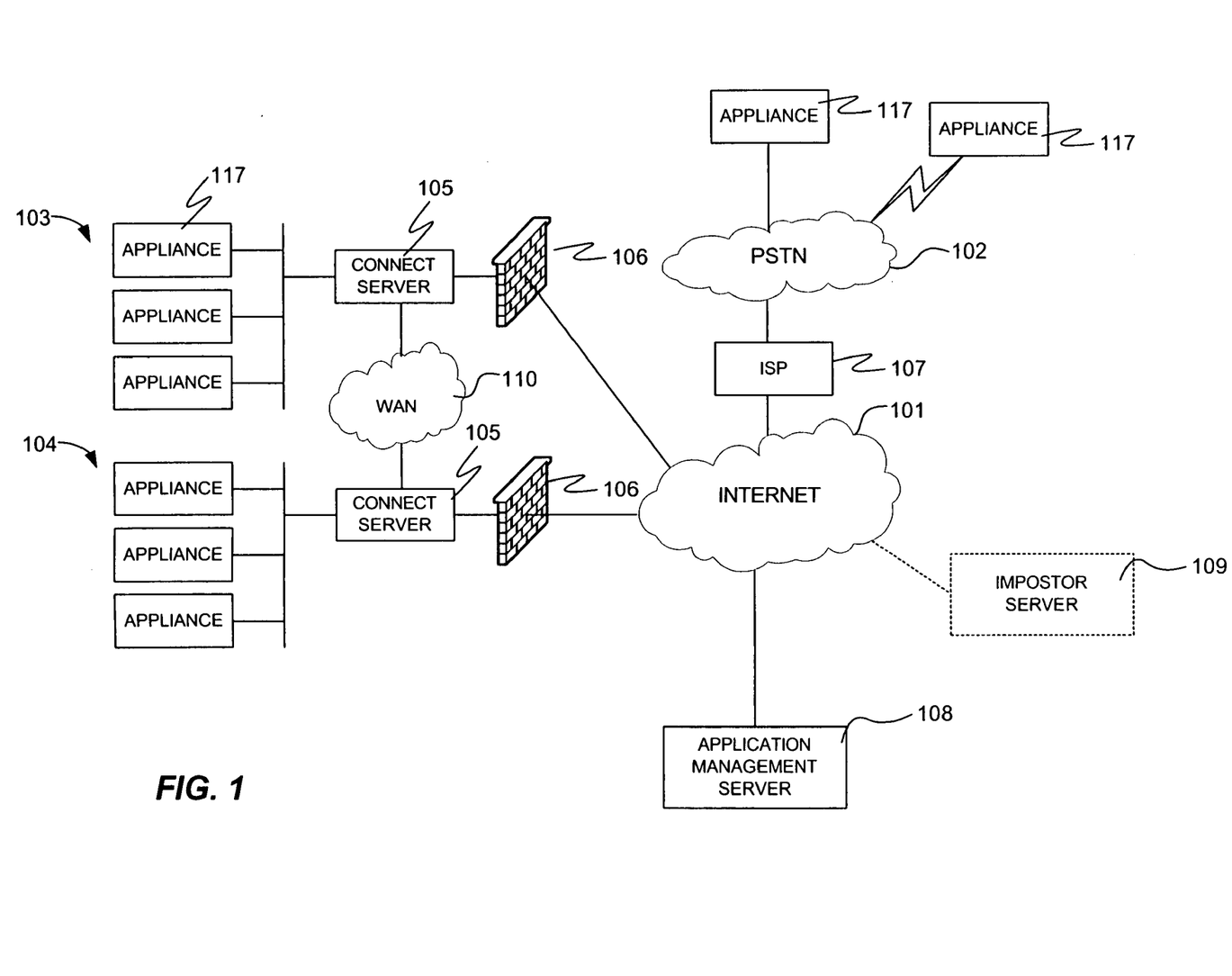
FIG. 1 shows an networked computer environment in which the present invention is implemented.

FIG. 1 shows an exemplary computing environment 100 in which the present invention may be implemented including a variety of internetworking components such as Internet 101, public switched telephone network (PSTN) 102, and a wide area network (WAN) 110. The distinct internetwork designations shown in FIG. 1 provide a conceptual model and are provided for ease of description and understanding. In practice, Internet 101 may include components of both PSTN 102 and WAN 110. Likewise, WAN 110 is often implemented using PSTN 102 and/or Internet 101.

Essentially, a number of computing devices and groups of devices are interconnected through a network 101. The particular embodiments described herein use the public national information infrastructure (i.e., the Internet) to implement network 101. Alternatively, network element 101 may be implemented as a private network using WAN technology, intranet technology, fibre channel, and the like.

A first network segment 103 and a second network segment 104 are interconnected using Internet 101 and/or WAN 110 in a typical fashion. Network segments 103 and 104 are usefully thought of as local area networks (LANs) although either or both may represent only a portion of a LAN in a given network's topology. The present invention is readily adapted for both client/server and peer-to-peer type networks as well as hybrid topologies. Network segments 103 and 104 comprise copper, optical, wireless and/or other available physical connection technologies.

LANs 103 and 104 implement physical and logical communications links between a number of network appliances 117. Local networks 103 and 104 are coupled to network 101 through connect servers 105 and/or firewalls 106. Connect servers 105 are implemented by connection sharing software such as Microsoft Internet connection sharing service (ICS) or by software such as found in routers. Firewalls 106 may also be implemented by a router or by other firewall software operating on a special purpose computer. LANs 103 and 104 may be implemented using any available topology and may implement one or more server technologies including, for example a UNIX, Novell, or Windows NT, or peer-to-peer type network. Each network will include distributed storage implemented in each device and typically includes some mass storage device (not shown) coupled to or managed by a server computer (not shown).

Appliances 117 provide application services to users. Network appliances 117 include, for example, computers, printers, file servers, mass storage and the like. Appliances 117 include computing devices varying in complexity from workstations and personal computers to hand-held computers and personal digital assistants to office equipment including telephones, copiers, fax machines and the like. One or more of appliances 117 may be configured as an application and/or file server. Each local network 103 and 104 may include a number of shared devices (not shown) such as printers, file servers, mass storage and the like. Similarly, appliances 117 may be shared through network 101 and/or WAN 110 to provide application and file services, directory services, printing, storage, and the like.

In addition to shared LAN connections to network 101, appliances 117 may also connect to network 101 using the public switched telephone network 102 by way of dial-up connections. Dial-up connections are supported by a variety of Internet service providers (ISPs) 107. Dial up connections may be support by landline connections or through wireless interfaces to PSTN 102 such as available in digital and analog cellular systems. ISP 107 supports a connection to network 101.

In accordance with the present invention, one or more application management servers 108 are coupled to network 101. For ease of description a single application management server 108 is shown, but in practice it is beneficial to provide tens, hundreds, or even thousands of application management servers 108 geographically distributed throughout the an application environment. Each application management server 108 has a unique address with respect to network 101 and so is reachable by network-connected appliances 117. The present invention leverages the existing Internet infrastructure to provide frequent, ubiquitous communication between appliances 117 and application management servers 108.

Each of the appliances and servers shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared mass storage (not shown) that provide mass storage capacity beyond what an individual device can efficiently use and manage. Selected components of the present invention may be stored in or implemented in shared mass storage.

Figure 2:
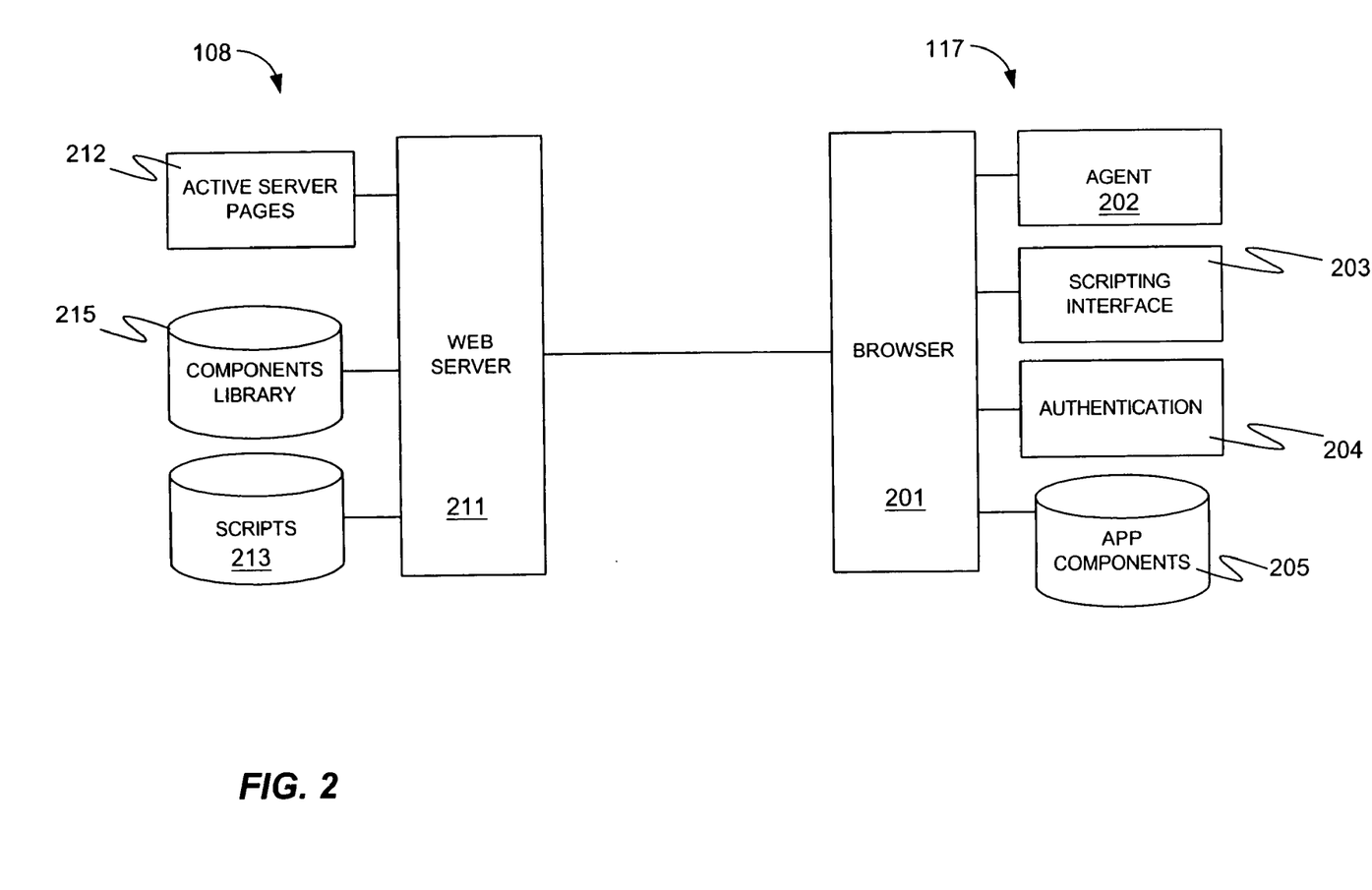
FIG. 2 illustrates basic components of a distributed computing system for implementing application services in accordance with the present invention.

FIG. 2 illustrates functional components of an appliance 117 and an application management server 108 in accordance with an embodiment of the present invention. A software-implemented agent 202 executes on the computing devices within the appliance 117. Agent 202 performs a relatively small number of functions in the application management solution in accordance with the present invention. First, agent 202 establishes a frequent connection with application management server 108 to check for updates in code and/or data used to provide the application services. When appropriate, agent 202 downloads updated code into memory and/or storage devices within appliance 117.

In the embodiment shown in FIG. 2 a world wide web browser 201 is used to implement network connectivity and to provide a mechanism through which software application functionality can be delivered. In a particular example, browser 201 is implemented using Microsoft Internet Explorer software which includes, among other things, a browser and network protocol stacks to implement hypertext transfer protocol (HTTP), transfer connection protocol (TCP) and Internet protocol (IP) to enable browser 201 to communicate with a web server 211 over Internet 101. Although the specific example uses a browser and HTTP user-level protocols for network connectivity, it should be understood that any available protocols and connectivity mechanisms may be used in practical implementations. Agent 202 may interact directly with network protocols provided by an operating system or operating system services within appliance 117, for example.

Preferably, agent 202 provides security functions as well to authenticate the identity of applications management server (AMS) 108 to prevent unauthorized download from impostor server 109 (shown in FIG. 1), for example. For example, agent 202 may require a digital certificate from AMS 108 signed by an independent certificate authority. Security functions also include functions to authenticate that any code downloaded from AMS 108 is authentic code intended for download to appliance 117. For example, agent 202 may require that any code include a digital signature such as a signature supplied by the Authenticode procedures of Verisign. Security functions may be incorporated within agent 202 or accessed via a separate authentication module 204. Many off-the-shelf Internet access packages include not only a web browser component 201, but also an authentication module 204 that includes methods for performing authentication and validation functions.

Appliance 117 also includes a set of application components 205. One feature of the present invention involves the installation, updating, and deletion of application components 205. The program code can be copied to a mass storage device of a client computer using a small number of well-defined privileged processes for disk access. However, installation of components 205 so that they may be executed as processes in the operating system environment requires more varied and flexible access to privileged processes. It is contemplated that the present invention will support an almost limitless variety of components 205. Accordingly, the installation of components 205 may require access to every privileged process provided in a particular operating system. Application components 205 or groups of components 205 may be provided as compressed files called "cabinet files" or ".cab" files after the commonly applied file extension.

Application components 205 comprise program code that implements some application function or set of functions. Application components 205 range in complexity from relatively simple functions that retrieve data from a database to complex programs that implement sophisticated behavior such as scanning the entire appliance 117 for viruses. In the particular example application components 205 are provided as compiled code stored in mass storage/memory of appliance 117. Each component 205 has an interface (e.g., application programmer's interface (API)) that enables the functionality of a given component 205 to be invoked. The interface(s) typically allows another component or process executing on the processor(s) of appliance 117 to pass data, commands and variables to the component 205 and receive data and commands back from the component 205.

In operation, agent 202 uses the network connectivity features of browser 201 to connect to web server 211. Web server 211 comprises a commercial web server software package such as Microsoft Internet Information Server (IIS), for example. Web server 211 is used to communicate with HTTP clients such as browser 201. In applications in which appliance 117 uses other network protocols web server 211 is conveniently replaced by complementary server software. Some advantages of using web server 211 to implement the server-side network interface is that web servers are widely available from a number of manufacturers and readily extended to implement new functionality.

In the example of FIG. 2, web server 211 uses active server pages (ASP) component 212. ASP component 212 is provided with IIS, but equivalent components that function to compile script or other interpreted language program files within a server machine are available for other server platforms. ASP 212 is used to compile scripts 213 in response to requests from appliance 117. The compiled scripts can be executed on web server 211 or forwarded to appliance 117 for execution.

In accordance with the present invention, software applications services are provided by cooperative action of scripts 213, agent 202, and application components 205. A separate and usually larger set (i.e., a superset) of application components are maintained on the server side in a components library 215. Depending on its size, components library 215 may be implemented in a storage device within application management server 108 or in external storage accessible to application management server 108. It is contemplated that application management server 108 will serve a wide variety of diverse applications and so the library 215 will contain a large number of application components compared to the selected set of application components 205 that exist within an appliance 117. The set of components 205 within any particular appliance 117 is selected by agent 202 to meet the needs of appliance 117 and provide the application services desired by its user.

In accordance with the present invention, an instance of a software application is constructed using a selected set of application components 205 that are cooperatively initiated and executed on appliance 117 according to application logic implemented in a script 213. The bulk of program code is typically in application components 205 while scripts 213 are relatively light-weight. It is expected that application components 205 will change relatively slowly although this is not a requirement. In contrast, a script 213 can be changed frequently.

Appliance 117 preferably includes a scripting interface 203 for executing script, including scripts 213, provided by server 211. Example scripting interfaces include VBScript, JScript, JavaScript. Markup language documents such as extensible markup language (XML) is an alternative tool enabling client-side program execution. Collectively, these are tools that enable execution of code on a client machine (e.g., appliance 117) that is generated by server 211.

At runtime, agent 202 determines whether the script 213 and/or any components 205 must be downloaded and/or installed. This can be done by determining whether any have changed since the last instance of the software application managed by agent 202. Many browsers 201 include mechanisms for determining whether a web page has changed, and these mechanisms are readily leveraged by the present invention to determine if any program components or scripts have changed. It is contemplated that agent 202 can access server 211 periodically, randomly, or on demand, for example, to determine if a new script or components require download. Alternatively, any downloaded components 205 or scripts 213 may be associated with expiration conditions. Once the expiration conditions are satisfied, agent 202 will download replacements.

It should be appreciated that the present invention discloses a system and method for deployment of applications services via dynamic distribution of software as opposed to conventional methods that focus on deploying application software and leave it to the end user to install, configure and cause the software to provide the desired services. By this it is meant that the present invention operates to ensure that every time an application is run, it is automatically updated with minimal or no user intervention so that it provides the desired services on demand. The user is only made aware of the services being provided, if desirable, not the exchange of code, configuration files, data files, and the like that occur in order to provide the application services. This can be a subtle difference to understand, but once realized it is apparent that the present invention teaches a fundamentally different way of deploying mechanisms to provide application services.

The present invention is particularly useful for a wide variety of application services that do not require or benefit from user interaction. For example, anti-virus software such as VirusScan ASaP™, WebShield ASaP™ and the like operate to detect and stop virus code automatically before it is executed. Another example is security assessment software that probes computer systems and networks to identify strengths and weaknesses. These types of application services often run as background processes that benefit little from user interaction. Because the present invention provides for continual update, configuration and execution, such services can be provided without imposing on the user to learn, understand, and manage yet another application.

The present invention is useful for application services that require access to privileged processes such as operating system functions. Because application components 205 execute on top of an operating system 301, all of the user interaction services provided by operating system 301 are available. Hence, full featured application services such as word processing services, spreadsheet services, graphics services, and the like are readily implemented using the software, systems and methods in accordance with the present invention.

Figure 3:
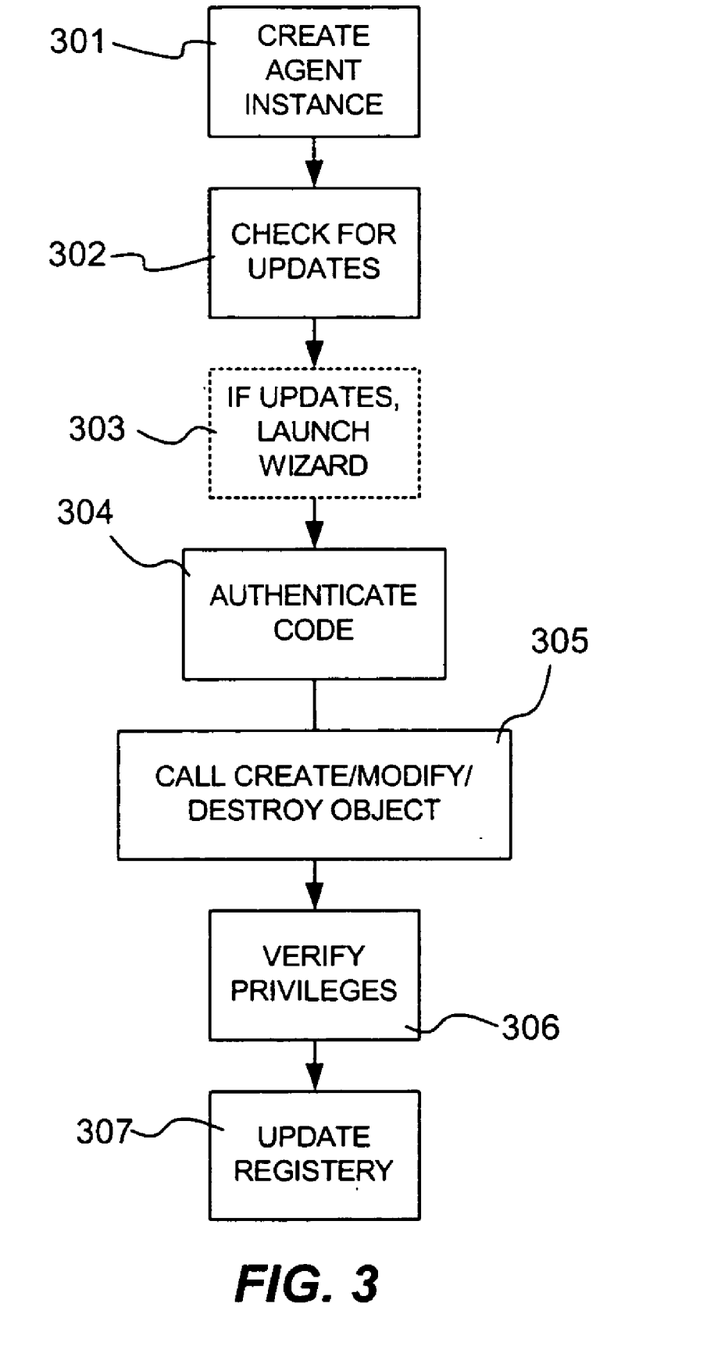
FIG. 3 illustrates steps in an exemplary implementation of the present invention.

FIG. 3 illustrates steps in an exemplary implementation of the present invention. Initially, an agent 202 having administrator-level privileges is installed and instantiated in a client or local computer in step 301. The agent 202 privileges are assigned by another entity, such as a system administrator, that already has sufficient privileges to assign admin-level privileges. It is contemplated that the created agent instance will be generic in that it contains powerful methods for implementing privileged processes, but it does not contain a specification as to specific behaviors to be implemented using those processes. For example, the agent instance includes a "CreateObject" method for creating registry objects in the NT programming environment, but lacks a specification as to any specific registry objects to be created. In other words, the agent 202 has no prior knowledge of the application service that is to be rendered. This allows the agent 202 to be multi-purpose as its behavior is readily customized, within bounds discussed hereinafter, to perform almost any function.

The agent 202 created in step 301 includes an interface for receiving messages from user-level and privilege level processes. The received messages identify a configuration file containing one or more components 205. The configuration file is implemented as a cabinet file 405 (shown in FIG. 4) containing components 205 and an initialization file (e.g., a ".ini" file 500 in FIG. 5).

In operation, the agent 202 includes methods for continuously checking for the presence of updated code on application management server 108 and/or outdated code within the appliance 117 on which the agent 202 exists. As needed, updates are downloaded in the form of scripts and cabinet files. The process of checking for updates involves, in the preferred embodiment, using a pluggable protocol. The agent 202 generates a network request message addressed to application management server 108 and specifying a proprietary protocol. The request message identifies the agent 202 and preferably provides authentication information such as a certificate that can be used by application manager 108 to authenticate the agent.

The request message specifies what code is being checked in step 302. Preferably, the request message identifies message formats and/or protocols that the agent 202 supports for received messages. For example, the agent 202 may have an installed file transfer protocol (FTP) client and a secure hypertext transfer protocol (SHTTP) client. Application management server 108 may use any available protocol to download updated code.

The downloaded update code is copied to appliance 117 but is not installed or executed at this stage. Merely downloading the code cannot interfere with functionality of the appliance 117. The downloading operation may use a minimal set of well-defined privileged processes to write a file into mass storage, these processes are controllable using conventional security precautions. Code components that are downloaded by application management server 108 include authentication information such as an Authenticode certificate. The authentication information identifies the source of the downloaded code and is used by the agent 202 subsequently to authenticate the code came from a trusted source and has not been modified since coming from the trusted source.

When a code update is loaded, a user-level installation process is started such as a wizard launched in step 303. In the particular examples, the wizard routine is executed within the contexts of a browser program such as Internet Explorer. The wizard provides a scripted user interface useful for supplying and obtaining user-specific information from a user such as name, licensing information, and the like. Once step 303 is completed, the wizard makes a call back to a defined interface in the agent 202 to launch provision of privileged process services. It is contemplated that some installations will not require user involvement in which case step 303 can be implemented without user interface components by making a call to the agent 202 in step 305.

The call to the agent 202 includes an identification of the configuration file. The entire configuration file may be passed to the agent interface, however, the configuration file may be passed by reference as well. Once called by the user-level process, the agent 202 authenticates the configuration file using, for example, the Authenticode certificate, in step 304. Authentication step 304 may be performed by the user-level process such as the wizard launched in step 303, or in a privileged-process such as the agent 202 (i.e., after step 305). Hence, the order of steps shown in FIG. 3 may be modified to accommodate the needs of a particular application. The authentication step 304 preferably validates the trustworthiness of the supplier of the configuration file as well as the integrity of the configuration file to ensure that the configuration file has not been changed from that which was created originally.

In step 305, the privileged process(es) is/are initialized. The agent 202 includes a set of generic methods for performing the privileged processes, but must access the configuration file to create a specific instance of the privileged process. Initialization step 305 involves creating a specific instance of the privilege process by referring to the configuration file that specifies particular objects that are affected by the generic method defined within the agent. By way of example, the privileged processes include methods to create, modify, and/or destroy objects including registry objects in a Windows NT computing environment. The configuration file contains particular object identifications that indicate specific objects that will be created, modified, or destroyed.

Once initialized, the specific instance of the privileged processes are verified in step 306. Essentially, step 306 determines whether the code to be installed has been declared "safe" to be assigned or inherit administrative privileges required for the code's execution. This analysis is akin to an operating system function, but is performed by agent 202 according to criteria specified in the configuration file itself. ActiveX controls, for example, can be declared safe for scripting, safe for initialization, but current implementations do not provide for a declaration that the control is safe to receive administrative privileges. In essence, the security considerations of existing ActiveX controls go to specific behaviors, but not to privileges assigned to the component.

In the particular example, the configuration file includes a specification or listing of objects that the agent 202 is permitted to create. Unless an object appears on the list, it cannot be created by the agent 202 even though the agent 202 has the operating system privilege level to perform the operation. This feature provides an additional security check to control operation of the privileged processes is implemented in accordance with controls instituted by the application management service 108. At step 307 the privileged processes are actually executed to perform functionality such as registry file updates.

Figure 4:
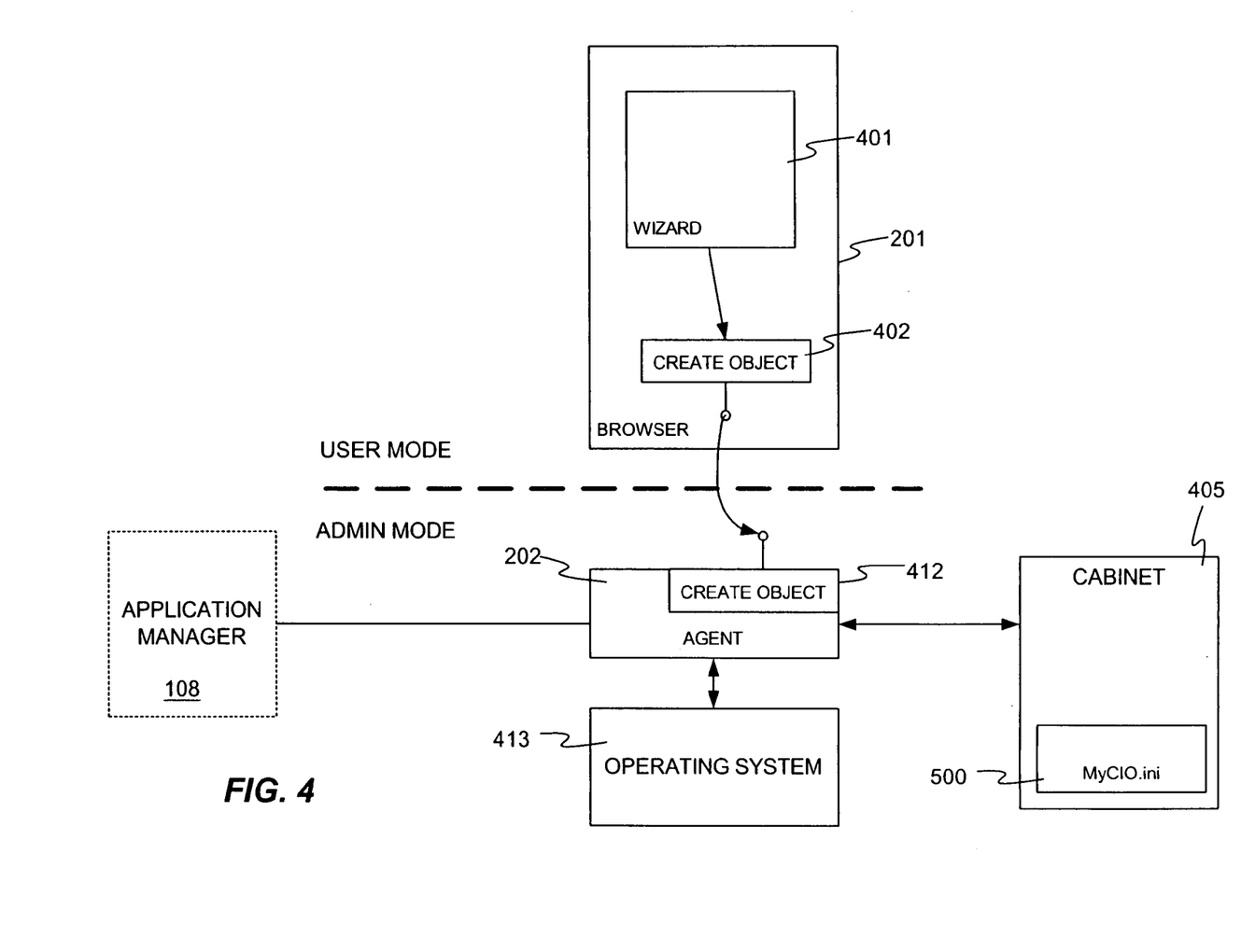
FIG. 4 illustrates operation of the present invention in functional block-diagram form.

FIG. 4. illustrates operation of the present invention using logical block diagram form to show relationships and data flow. In the particular implementation shown in FIG. 4, a web browser program 201 executing as a user-level process is used as a primary user interface. Browser 201 supports the execution of applications, applets, scripts, scriptlets and the like. These types of code are characterized in that they tend to be easily ported across multiple platforms and comprise procedural and/or object oriented code that is executed within the context of the browser 201 to provide extended functionality. An example is an applet 401 that implements the wizard user interface described in reference to FIG. 3.

Wizard 401 obtains and provides user-specific information and at a desired point in its execution make a call either directly or through a helper script to a "create object" program components such as an executable function defined in a dynamic link library (dll) file 402. The create object component 402 is executing in user-mode, and so can not, by itself, create an object such as a registry object that requires a privileged process. However, create object component 402 implements an interface that sends a message to a "create object" interface 412 of privilege mode process such as agent 202. The message includes an identification of a configuration file such as cabinet file 405.

The create object interface 412 is accessible by user mode processes, and can access privileged processes by accessing functions within system 413. However, agent 202 only performs privilege level functions after authenticity and other security methods contained within agent 202 are satisfied as described in reference to FIG. 3. Agent 202 can access cabinet file 405 to read the application service-specific information contained therein, authenticate certificates, and obtain program components 205 contained therein. Agent 202 reads an initialization file 500 to obtain instructions that enable it to create specific instances of the privileged processes. Agent 202 also includes and interface to application manager 108 to perform the code updating functions described in reference to FIG. 3. The references to application manager 108 and cabinet file 405 may actually involve operating system functionality to access a file system or network resource.

Figure 5:
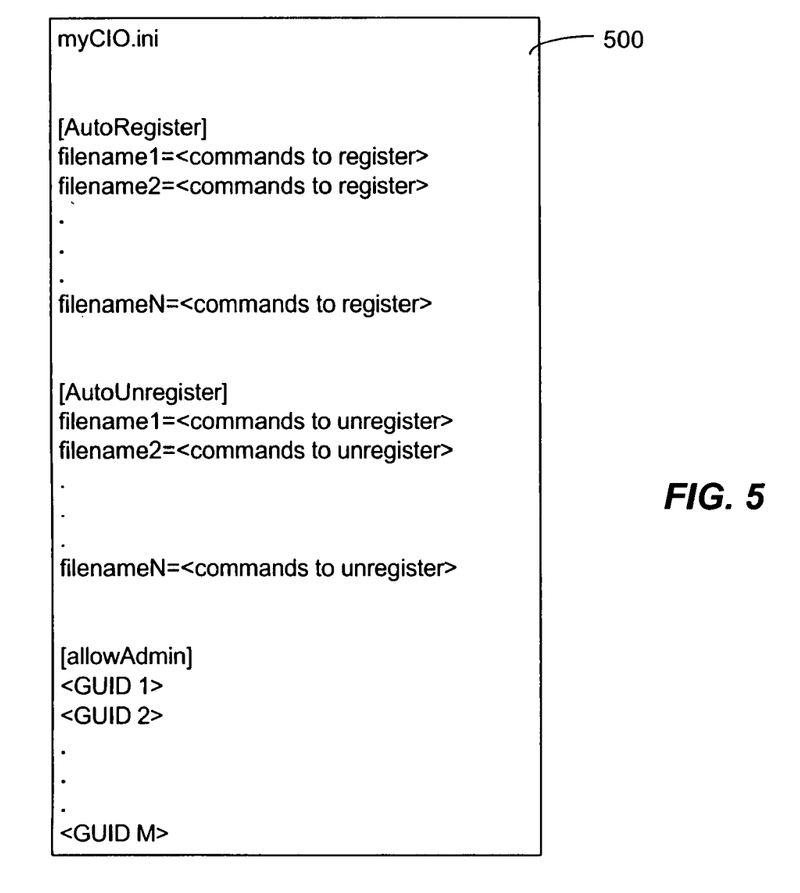
FIG. 5 shows an exemplary configuration file used to provide application services in accordance with the present invention.

FIG. 5 illustrates an exemplary portion of a configuration file 500. The configuration file 500 in the particular example comprises an initialization file embedded within cabinet file 405. The initialization file 500 is represented in plain text format comprising a plurality of sections denoted by brackets "[ ]" with a number of attribute specifications within each section. It is contemplated that the initialization file 500 may be encrypted or outfitted with other security precautions to prevent or inhibit direct viewing and modification of the contents. However, any modifications will affect validity of the authenticity certificate associated with cabinet file 405. Likewise, cabinet file 405 is typically provided in a compressed format with write restrictions that impede modifications.

In the example of FIG. 5, initialization file 500 includes an "AutoRegister" section, an "AutoUnregister" section, and an "allowAdmin" section. The AutoRegister section contains a listing of file names associated with instructions or commands used to register the associated file with the operating system (e.g., install the file). For example, a particular entry will include a file name and the location in the hierarchical tree of the registry file that requires a object and/or attributes of the required object. The AutoUnregister section contains a similar listing of file names associated with commands required to remove or uninstall the associated file from the registry.

Agent 202 reads the AutoRegister section and uses the specifications to define specific instances of the privileged processes specified by the file 500. While the specific instance can be defined by reference to the AutoRegister section, a further security check is preferably implemented by the "allowAdmin" section. This section contains a listing that identifies objects that are allowed to be created by agent 202. The objects are identified in FIG. 5 using a globally unique identifier (GUID). The GUID is a 16-byte identification value that uniquely identifies each object in the system, although any identification system that provides object identification with a sufficient level of granularity may be used. Agent 202 includes methods that prevent creation of an object using privileged processes, even if that object is specified in the AutoRegister section, unless that object is identified in the allowAdmin section.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for providing application services in a computing environment having both user-mode processes and privileged-mode processes, the system comprising:

an agent executing in privileged mode and exposing an interface to user-mode processes;

a user-mode component having an interface configured to access the agent's exposed interface; and     a configuration component specifying a list of installable code components that are authorized for installation, wherein the agent will only execute privilege mode functions in response to accesses by the user-mode code component when the installable code component is represented on the list;

wherein the user-mode component comprises an application software installation wizard;

wherein specifications are included within the configuration component specifying instructions for installing program components into an operating system;

wherein the agent is capable of creating an instance of the application software installation wizard in accordance with a definition supplied in the configuration component; and wherein the configuration component includes an initialization file embedded within a cabinet file, the initialization file represented in a plain text format and comprising a plurality of sections each including attribute specifications, the initialization file including an AutoRegister section, an AutoUnregister section, and an allowAdmin section.

2. The system of claim 1 wherein the configuration component includes a digital signature.

3. The system of claim 1 further comprising a user interface implemented within the user-mode component.

4. The system of claim 1 wherein the agent behavior is configured by the contents of the configuration component.

5. The system of claim 2 wherein the agent is capable of authenticating the digital signature.

6. The system of claim 1 wherein specifications are included within the configuration component specifying a list of objects that are permitted to be created by the agent; and the agent is responsive to the list of objects to prevent creation of any object unless it is specified on the list of objects.

7. A method for managing privileges in a computing environment having both user-mode processes and privileged-mode processes, the method comprising:
executing an agent in privileged mode;
exposing an interface of the agent to user-mode processes;
accessing the agent's exposed interface using a user-mode component;
specifying a list of authorized code components in a configuration file;
authenticating that the configuration file comes from a trusted source; and
executing privileged-mode processes specified by the configuration file using the agent, wherein the agent will only execute privileged-mode processes in response to access by the user-mode code component when the configuration file is authenticated as coming from a trusted source;
wherein the user-mode component comprises an application software installation wizard;
wherein specifications are included within the configuration file specifying instructions for installing program components into an operating system;

wherein the agent is capable of creating an instance of the application software installation wizard in accordance with a definition supplied in the configuration file; and wherein the configuration file includes an initialization file embedded within a cabinet file, the initialization file represented in a plain text format and comprising a plurality of sections each including attribute specifications, the initialization file including an AutoRegister section, an AutoUnregister section, and an allowAdmin section.

8. The method of claim 7 further comprising specifying a digital signature within the configuration file.

9. The method of claim 7 further comprising implementing a user interface implemented within the user-mode component.

10. The method of claim 7 further comprising extending the agent's program behavior according to the contents of the configuration file.

11. The method of claim 8 wherein the digital signature is authenticated using the agent.

12. The method of claim 7 wherein a list of objects is specified within the configuration file that are permitted to be created by the agent; wherein, in response to the list of objects, creation of any object is prevented unless it is specified on the list of objects.

13. The system of claim 1 wherein the configuration component includes a cabinet (.cab) file.

14. The system of claim 13 wherein the cabinet (.cab) file is compressed.

15. The system of claim 1 wherein the application software installation wizard is executed utilizing a network browser program.

16. The system of claim 1 wherein the application software installation wizard includes a scripted user interface for supplying and obtaining user-specific information including a name and licensing information.

17. The system of claim 1 wherein the application software installation wizard makes a call to a create object program component including an executable function defined in a dynamic link library (.dll) file, and the create object program component executes in a user-mode for sending a message to a create object interface of the agent, the message including an identification of the configuration component.

18. The system of claim 1 wherein the AutoRegister section includes a listing of file names associated with instructions used to register an associated file with the operating system, and the AutoUnregister section includes a listing of file names associated with instructions required to remove the associated file from a registry.

* * * * *